United States Patent
Abbaszadeh et al.

(10) Patent No.: US 11,343,266 B2
(45) Date of Patent: *May 24, 2022

(54) SELF-CERTIFIED SECURITY FOR ASSURED CYBER-PHYSICAL SYSTEMS

(71) Applicant: General Electric Company, Schenectady, NY (US)

(72) Inventors: Masoud Abbaszadeh, Clifton Park, NY (US); Hema K. Achanta, Schenectady, NY (US); Mustafa Tekin Dokucu, Latham, NY (US); Matthew Nielsen, Glenville, NY (US); Justin Varkey John, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 307 days.

This patent is subject to a terminal disclaimer.

(21) Appl. No.: 16/436,093

(22) Filed: Jun. 10, 2019

(65) Prior Publication Data

US 2020/0389478 A1 Dec. 10, 2020

(51) Int. Cl.
*H04L 9/40* (2022.01)
*H04L 29/06* (2006.01)
(Continued)

(52) U.S. Cl.
CPC .......... *H04L 63/1425* (2013.01); *H04L 41/16* (2013.01); *H04L 41/28* (2013.01); *H04L 63/1475* (2013.01)

(58) Field of Classification Search
USPC ........................................................ 726/22
See application file for complete search history.

(56) References Cited

U.S. PATENT DOCUMENTS 8,527,776 B2 9/2013 Botros et al.
9,386,030 B2 7/2016 Vashist et al.
(Continued)

FOREIGN PATENT DOCUMENTS

CN 102938024 B 3/2016

OTHER PUBLICATIONS

Guckenheimer et al., "A Fast Method for Approximating Invariant Manifolds", SIAM Journal on Applied Dynamical Systems, vol. 03, Issue: 03, pp. 232-260, Jan. 2004, 29 pp.
(Continued)

*Primary Examiner* — Sakinah White Taylor
(74) *Attorney, Agent, or Firm* — Buckley, Maschoff & Talwalkar LLC

(57) ABSTRACT

Methods and systems for self-certifying secure operation of a cyber-physical system having a plurality of monitoring nodes. In an embodiment, an artificial intelligence (AI) watchdog computer platform obtains, using the output of a local features extraction process of time series data of a plurality of monitoring nodes of a cyber-physical system and a global features extraction process, global features extraction data. The AI watchdog computer platform then obtains reduced dimensional data, generates an updated decision boundary, compares the updated decision boundary to a certification manifold, determines based on the comparison that the updated decision boundary is certified, and determines, based on an anomaly detection process, whether the cyber-physical system is behaving normally or abnormally.

22 Claims, 9 Drawing Sheets

(51) Int. Cl.
*H04L 41/28* (2022.01)
*H04L 41/16* (2022.01)

(56) References Cited

U.S. PATENT DOCUMENTS

| | | | |
|---|---|---|---|
| 9,405,900 | B2 | 8/2016 | Dixit et al. |
| 9,680,855 | B2 | 6/2017 | Schultz et al. |
| 9,912,733 | B2 | 3/2018 | T et al. |
| 9,998,487 | B2 | 6/2018 | Mestha et al. |
| 10,012,988 | B2* | 7/2018 | Danielson ............ G05D 1/0088 |
| 10,204,226 | B2 | 2/2019 | Bushey et al. |
| 1,059,779 | A1 | 3/2020 | Madani et al. |
| 2007/0088550 | A1 | 4/2007 | Filev et al. |
| 2010/0281086 | A1* | 11/2010 | Gan ........................ G06F 17/10 706/14 |
| 2012/0304008 | A1 | 11/2012 | Hackstein |
| 2013/0060524 | A1 | 3/2013 | Liao |
| 2013/0132149 | A1 | 5/2013 | Wei et al. |
| 2015/0346066 | A1 | 12/2015 | Dutta et al. |
| 2016/0149931 | A1* | 5/2016 | Ramos ................ H04L 63/1408 726/22 |
| 2017/0220801 | A1 | 8/2017 | Stockdate et al. |
| 2017/0230410 | A1 | 8/2017 | Hassanzadeh et al. |
| 2017/0237752 | A1 | 8/2017 | Ganguly et al. |
| 2017/0353477 | A1 | 12/2017 | Faigon et al. |
| 2017/0359366 | A1 | 12/2017 | Bushey et al. |
| 2018/0019910 | A1* | 1/2018 | Tsagkaris ............ H04L 43/0817 |
| 2018/0157831 | A1 | 6/2018 | Abbaszadeh et al. |
| 2018/0159879 | A1 | 6/2018 | Mestha et al. |
| 2018/0248904 | A1* | 8/2018 | Villella .................. G06N 20/10 |
| 2018/0248905 | A1 | 8/2018 | Cote et al. |
| 2018/0255091 | A1 | 9/2018 | Mestha et al. |
| 2018/0255379 | A1 | 9/2018 | Cella et al. |
| 2018/0276375 | A1 | 9/2018 | Aprov et al. |
| 2018/0293734 | A1 | 10/2018 | Lim et al. |
| 2018/0336439 | A1 | 11/2018 | Kliger et al. |
| 2019/0068618 | A1* | 2/2019 | Mestha ............... H04L 63/1425 |
| 2019/0147343 | A1 | 5/2019 | Lev et al. |
| 2019/0174207 | A1* | 6/2019 | Celia ...................... H04L 67/12 |
| 2019/0368133 | A1 | 12/2019 | Joshi et al. |
| 2020/0242353 | A1* | 7/2020 | Zhang .................. G06N 3/0454 |

OTHER PUBLICATIONS

Gear, "Towards Explicit Methods for Differential Algebraic Equations", The Journal BIT, vol. 46, Issue: 03, pp. 505-514, Sep. 2006, 10 pp.

Abbaszadeh et al., "A Generalized Framework for Robust Nonlinear H∞H∞ Filtering of Lipschitz Descriptor Systems with Parametric and Nonlinear Uncertainties", International Federation of Automatic Control, vol. 48, Issue: 05, pp. 894-900, May 2012, 26 pp.

Abbaszadeh, "Generalized Dynamic Robust Energy-to-Peak Filtering of Nonlinear Descriptor Systems with Uncertainties", 11th International Conference on Information Science, Signal Processing and their Applications (ISSPA), pp. 712-717, Sep. 24, 2012, 6 pp.

Shmoylova et al., "Simplification of Differential Algebraic Equations by the Projection Method", In Proceedings of the 5th International Workshop on Equation-Based Object-Oriented Modeling Languages and Tools, vol. 84, pp. 87-96, 2013, 10 pp.

Ntalampiras, "Automatic Identification of Integrity Attacks in Cyber-Physical Systems", Expert Systems with Applications, vol. 58, pp. 164-173, Oct. 1, 2016, 10 pp.

Tarao et al., "Toward an Artificial Immune Server against Cyber Attacks: Enhancement of Protection against DoS Attacks", Procedia Computer Science, vol. 96, pp. 1137-1146, 2016, 10 pp.

Wu et al., "Detecting Cyber-Physical Attacks in CyberManufacturing Systems with Machine Learning Methods", Journal of Intelligent Manufacturing, vol. 30, Issue: 03, pp. 1111-1123, Feb. 23, 2017, 13 pp.

Mestha et al., "Cyber-Attack Detection and Accommodation Algorithm for Energy Delivery Systems", IEEE Conference on Control Technology and Applications (CCTA), pp. 1326-1331, Oct. 9, 2017, 6 pp.

Krauskopf et al., "Global Stable Manifold of the Lorenz System Invariant Manifolds", SIAM Dynamical Systems Web, pp. 02, Mar. 1, 2019, 2 pp.

Yu, Shun-Zheng et al., "A hidden semi-Markov model with missing data and multiple observation sequences for mobility tracking", Signal Processing, vol. 83, Issue: 2, Feb. 2003, (pp. 235-250, 16 pages).

Sarkar, S. et al., "Chapter 18—Probabilistic Graphical Modeling of Distributed Cyber-Physical Systems", Cyber-Physical Systems, 2017, DOI: 10.1016/B978-0-12-803801-7.00018-3, (pp. 265-285, 21 pages).

Goernitz, Nico et al., "Toward Supervised Anomaly Detection", Journal of Artificial Intelligence Research, vol. 46, pp. 235-262, 2014, 28 pages.

Dai, Zihang et al., "Good Semi-supervised Learning that Requires a Bad GAN", arXiv.org, May 27, 2017, 14 pages.

Zheng, Panpan et al., "One-Class Adversarial Nets for Fraud Detection", arXiv.org, Jun. 5, 2018, 10 pages.

Lim, Swee Kiat et al., "DOPING: Generative Data Augmentation for Unsupervised Anomaly Detection with GAN", 2018 IEEE International Conference on Data Mining (ICDM), pp. 1122-1127, Singapore, 2018, 11 pages.

* cited by examiner

| CPS identifier | CPS description | Local feature vectors | Global feature vectors | Status |
|---|---|---|---|---|
| CPS_101 | Gas turbine (MN_101) | | | Normal |
| CPS_101 | Gas turbine (MN_102) | | | Attacked |
| CPS_101 | Gas turbine (MN_103) | | | Normal |
| CPS_102 | Power line (MN_101) | | | Fault |

SELF-CERTIFIED SECURITY FOR ASSURED CYBER-PHYSICAL SYSTEMS

BACKGROUND

Industrial control systems that operate physical systems (e.g., associated with power turbines, jet engines, locomotives, autonomous vehicles, and the like) are increasingly connected to the Internet. As a result, these control systems have been increasingly vulnerable to threats, such as cyber-attacks (e.g., associated with a computer virus, malicious software, etc.) that could disrupt electric power generation and distribution, damage engines, inflict vehicle malfunctions, and the like. Current cyber-security methods primarily consider attack detection in Information Technology ("IT," such as, computers that store, retrieve, transmit, and/or manipulate data) and Operation Technology ("OT," such as direct monitoring devices and communication bus interfaces). Cyber-attacks can still penetrate through these protection layers and reach the physical "domain" as seen in 2010 with the Stuxnet attack. Such attacks can diminish the performance of a control system and may cause total shut down or even catastrophic damage to a plant. Currently, few methods are available to automatically detect, during a cyber-incident, attacks at the domain layer where sensors, controllers, and actuators are located. In some cases, multiple attacks may occur simultaneously (e.g., more than one actuator, sensor, or parameter inside control system devices might be altered maliciously by an unauthorized party at the same time). Note that some subtle consequences of cyber-attacks, such as stealthy attacks occurring at the domain layer, might not be readily detectable (e.g., when only one monitoring node, such as a sensor node, is used in a detection algorithm). It may also be important to determine when a monitoring node is experiencing a fault (as opposed to a malicious attack) and, in some cases, exactly what type of fault is occurring and where it is located. Existing approaches to protect an industrial control system, such as failure and diagnostics technologies, may not adequately address cyber-attacks.

Cybersecurity solutions protecting critical infrastructure and industrial control systems may be susceptible to adversarial targeting themselves. Furthermore, a cyber-physical security engine needs to learn continuously in order to adapt to normal degradation in asset performance and/or operational changes over time. The continuous learning process can be intentionally manipulated by adversaries which may include the use of artificial intelligence ("AI"). For example, the outcome of an online learning process may include an adaptive resilient decision boundary (which can be used both for attack detection and for localization), and an attacker could adversely intervene and/or manipulate the training data used for continuous learning or attack the learning algorithm itself, which could result in the creation of an incorrect or false decision boundary. Such attacks are sometimes referred to as poisoning attacks. An attacker might also attempt to generate data samples in an intelligent manner that are capable of evading the anomaly detection, which attacks are referred to as evasion attacks.

In addition, many current cyber-attack detection technologies are passive and rely solely on monitoring data collected from the cyber-physical system. These types of protection schemes may fail in the face of a mass spoofing attack and/or a replay attack. It would therefore be desirable to provide a method to track the evaluation of an attack detection/localization decision boundary and to verify changes in the decision boundary so as to provide automatic immunity to the machine learning process, resulting in providing protection to a cyber-physical system from cyber-attacks and other abnormal operation in an automatic and accurate manner.

SUMMARY

Methods and systems for self-certifying secure operation of a cyber-physical system having a plurality of monitoring nodes are disclosed. In an embodiment, the monitoring nodes of the cyber-physical system each generates a series of current monitoring node values over time representing current operation of the cyber-physical system, and an artificial intelligence (AI) watchdog computer platform obtains, by using the output of a local features extraction process of time series data of a plurality of monitoring nodes of a cyber-physical system and a global features extraction process, global features extraction data. The process also includes the AI watchdog computer platform generating reduced dimensional data by utilizing a resilient dimensionality reduction process on the global features extraction data, then generating an updated decision boundary based on the reduced dimensional data, comparing the updated decision boundary to a certification manifold, determining, based on the comparison of the updated decision boundary to the certification manifold, that the updated decision boundary is certified, and then determining, based on an anomaly detection process, whether the cyber-physical system is behaving normally or abnormally.

In some embodiments, the method also includes the AI watchdog computer platform receiving from an abnormality detection and localization computer platform, data comprising a current decision boundary of a cyber security system of the cyber-physical system, then determining that the current decision boundary does not satisfy the certified decision boundary, and correcting the current decision boundary by projecting it onto the certification manifold. The process may also include transmitting the corrected decision boundary to the abnormality detection and localization computer platform. In an implementation, the method may also include transmitting a system status message indicating a possible attack on the cyber-security system to a monitoring device of an operator. In addition, the method may include setting a boundary status to projected, and determining whether the cyber-physical system is behaving normally or abnormally based on an anomaly detection process. The AI watchdog computer platform may also transmit to a monitoring device of an operator, a system status message indicating one of normal or abnormal behavior of the cyber-physical system.

In some embodiments, the certification manifold is generated utilizing an off-line training process. Thus, in some implementations, the off-line training process may include the AI watchdog computer platform generating, based on a local features extraction process of time series data of monitoring nodes data associated with the cyber-physical system and a global features extraction process, global features extraction data, generating resilient reduced dimensional data by using a resilient dimensionality reduction process on the global features extraction data, generating, using a training classifier on the reduced dimensional data, a decision boundary, and generating, by using invariance learning on the reduced dimensional data, on the decision boundary, and on at least two of system models data, known invariances data, known system invariances data and data-driven uncertainty quantification data, a certification manifold. In some implementations, invariance learning may include utilizing at least one of a first-principle physics-based learning process of the intrinsic physical invariances of the cyber-physical systems and a data-driven learning process of the invariant principles of a cyber-physical system using artificial intelligence (AI) processing. In addition, the AI processing may include at least one of deep neural networks, recurrent neural networks, and Gaussian models. In some embodiments, the global features extraction process may include one of obtaining higher level features from local features and obtaining features that capture interaction between different signals directly from the time series data. In addition, the local features extraction process may include the AI watchdog computer platform receiving monitoring node data of a plurality of monitoring nodes, extracting feature data from the monitoring node data of each monitoring node, utilizing a random projection for dimensionality reduction process on the feature data of each monitoring node to obtain corresponding projection data for each node, and training corresponding classifiers to detect anomalies corresponding to each node.

Another embodiment relates to a system for self-certifying secure operation of a cyber-physical system having a plurality of monitoring nodes wherein each monitoring node generates a series of current monitoring node values over time representing current operation of the cyber-physical system. The system may include an abnormality detection and localization computer platform operably connected to a cyber-physical system, and an artificial intelligence (AI) watchdog computer platform operably connected to the abnormality detection and localization computer platform and the cyber-physical system. In some embodiments, the AI watchdog computer includes a watchdog processor and a memory, wherein the memory stores executable instructions which when executed cause the watchdog processor to obtain global features extraction data by using the output of a local features extraction process of time series data of a plurality of monitoring nodes of a cyber-physical system and a global features extraction process, generate, utilizing a resilient dimensionality reduction process on the global features extraction data, reduced dimensional data, generate an updated decision boundary based on the reduced dimensional data, compare the updated decision boundary to a certification manifold, determine, based on the comparison of the updated decision boundary to the certification manifold, that the updated decision boundary is certified, and determine, based on an anomaly detection process, whether the cyber-physical system is behaving normally or abnormally.

In some embodiments of the system, the memory of the AI watchdog computer stores further executable instructions which when executed cause the watchdog processor to receive, from an abnormality detection and localization computer platform, data comprising a current decision boundary of a cyber security system of the cyber-physical system, determine that the current decision boundary does not satisfy the certified decision boundary, and then correct the current decision boundary by projecting it onto the certification manifold. In addition, the memory of the AI watchdog computer may store further executable instructions which when executed cause the watchdog processor to transmit the corrected decision boundary to the abnormality detection and localization computer platform. Also, the memory of the AI watchdog computer may store further executable instructions which when executed cause the watchdog processor to transmit a system status message indicating a possible attack on the cyber-security system to a monitoring device of an operator.

In some system embodiments, the memory of the AI watchdog computer may store further executable instructions which when executed cause the watchdog processor to set a boundary status to projected, and determine, based on an anomaly detection process, whether the cyber-physical system is behaving normally or abnormally. In addition, the memory of the AI watchdog computer may store further executable instructions which when executed cause the watchdog processor to transmit a system status message indicating one of normal or abnormal behavior of the cyber-physical system to a monitoring device of an operator.

In other system embodiments, the memory of the AI watchdog computer may store further executable instructions, prior to the instructions for comparing the updated decision boundary to the certification manifold, which when executed cause the watchdog processor to generate the certification manifold by using an off-line training process. In addition, the memory of the AI watchdog computer may store further executable instructions comprising the off-line training process, which when executed cause the watchdog processor to generate, based on a local features extraction process of time series data of monitoring nodes data associated with the cyber-physical system and a global features extraction process, global features extraction data, generate, using a resilient dimensionality reduction process on the global features extraction data, resilient reduced dimensional data, generate, using a training classifier on the reduced dimensional data, a decision boundary, and generate, using invariance learning on the reduced dimensional data, on the decision boundary, and on at least two of system models data, known invariances data, known system invariances data and data-driven uncertainty quantification data, a certification manifold. Also, the memory of the AI watchdog computer may store further executable instructions encompassing invariance learning, which when executed cause the watchdog processor to utilize at least one of a first-principle physics-based learning process of the intrinsic physical invariances of the cyber-physical systems and a data-driven learning process of the invariant principles of a cyber-physical system using artificial intelligence (AI) processing.

In yet other system embodiments, the memory of the AI watchdog computer may store further executable instructions comprising the global features extraction process, which when executed cause the watchdog processor to one of obtain higher level features from local features and obtain features that capture interaction between different signals directly from the time series data. In addition, the memory of the AI watchdog computer may store further executable instructions comprising the local features extraction process, which when executed cause the watchdog processor to receive monitoring node data of a plurality of monitoring nodes, extract feature data from the monitoring node data of each monitoring node, utilize a random projection for dimensionality reduction process on the feature data of each monitoring node to obtain corresponding projection data for each node; and train corresponding classifiers to detect anomalies corresponding to each node.

Another embodiment concerns a computer system for self-certifying operation of a cyber-physical system, wherein the computer system is configured to receive global features extraction data, the global features extraction data generated at least in part using the output of a local features extraction process of time series data of a plurality of monitoring nodes of a cyber-physical system, generate reduced dimensional data by utilizing a resilient dimensionality reduction process on the global features extraction data, and generate an updated decision boundary based on the reduced dimensional data. The computer system is also configured to compare the updated decision boundary to a certification manifold, determine that the updated decision boundary is certified based at least in part on the comparison of the updated decision boundary to the certification manifold, and determine whether the cyber-physical system is behaving normally or abnormally based at least in part on an anomaly detection process.

Technical advantages of some embodiments disclosed herein include providing a robust capability for protecting machine learning algorithms (including cybersecurity engines, which also could be attacked) against intelligent adversaries, and providing a method to validate updates of a decision boundary in real-time using a process such as continuous learning. In addition, a method is provided that protects a cybersecurity engine from being targeted itself, which can also be used beyond the realm of cyber-security, for example, to protect online machine learning solutions for safety critical missions, or the like.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Disclosed herein are methods, systems and apparatus for providing a separate artificial intelligence ("AI") watchdog process that is used to monitor a cyber-security system, which system could itself be the target of a cyber-attack. In implementations, the AI watchdog process tracks or monitors the evaluation of a decision boundary and then verifies the changes in the decision boundary against a certification manifold. In some embodiments, the AI watchdog process maps the evolution of the physical dynamics of the system over time (for example, it maps degradation, different operation modes, and the like) into an acceptable manifold or certification manifold which is then used to evaluate the decision boundaries in the feature space. The certification manifold could be, for example, polytypic bounds on the current values of the features or their derivatives, or a set of nonlinear algebraic constraints. If the evolution of the decision boundary does not satisfy the certification manifold, then the AI watchdog process rejects the new decision boundary (which indicates that the security system itself is under attack) and, in some implementations, optimizes or corrects the new decision boundary by projecting the new decision boundary onto the certification manifold.

Figure 1:
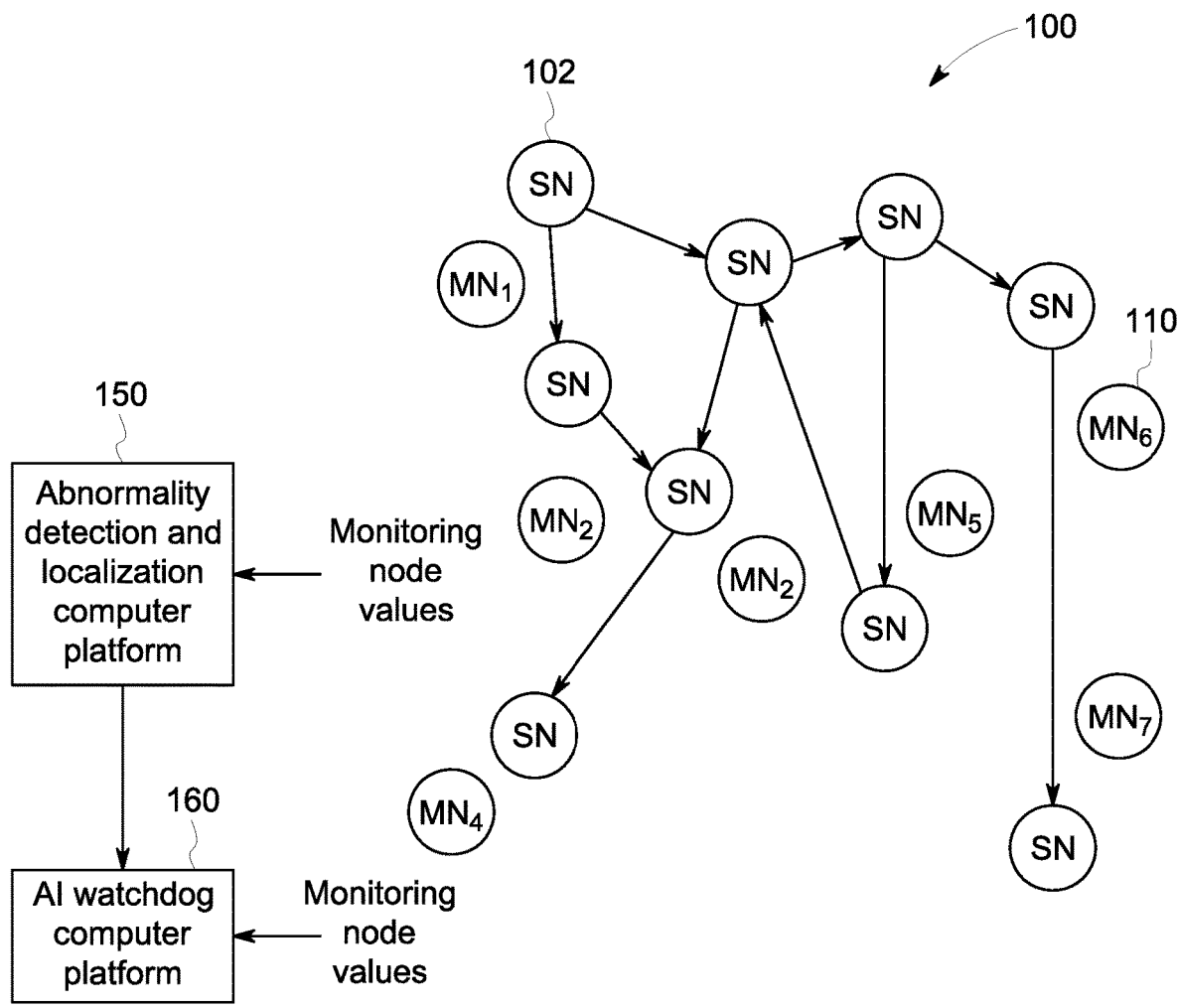
FIG. 1 is a high-level block diagram of an ICS system that may be provided in accordance with some embodiments of the disclosure.

A cyber-physical system, such as an Industrial Control Systems ("ICS"), might be associated with large-scale systems having many monitoring nodes. FIG. 1 is a high-level block diagram of an ICS system 100 that may be provided in accordance with some embodiments. The system 100, such as an industrial asset associated with power generation, an electric grid, gas turbines, a data center, and the like is made up of interconnected system nodes 102 ("SN" in FIG. 1), which may be associated with sensors, actuators, data paths, sub-components of the system, and the like. Some system nodes 102 are associated with a monitoring node 110 that generates a series of current monitoring node values over time which represent a current operation of a cyber-physical system (for example, a gas turbine). Note that any particular monitoring node 110 may be physically located such that it is not associated with any system node 102 or may be associated with multiple system nodes 102. Moreover, a single system node 102 might be associated with more than one monitoring node 110. The system 100 may create global and local feature vector decision boundaries that can then be used to classify operation as "normal," "abnormal," "fault" and the like. The system 100 may also include an abnormality detection and localization computer platform 150 and an artificial intelligence (AI) Watchdog computer platform 160. The abnormality detection and localization computer platform 150 may operate to automatically and quickly determine where an abnormality originated due to a cyber-attack, whereas the AI watchdog computer platform 160 may operate to monitor the abnormality detection and localization computer platform 150, which itself could itself be the target of a cyber-attack. In implementations disclosed herein, the AI watchdog computer platform 160 monitors the evolution of a decision boundary being used by the abnormality detection and localization computer platform 150 in order to verify any changes in the decision boundary against a certification manifold in accordance with processes described herein. As used herein, the term "automatically" may refer to a process that may be performed with little (or no) human intervention.

Many cyber-physical systems are described by a set of differential algebraic equations (DAE) in which the differential equations capture the system dynamics while the algebraic questions represent the inherent algebraic constraints among the system variables. A DAE system, also called a descriptor system, may be depicted in the following form:

$$\dot{x}(t)=f(x(t),y(t),z(t),u(t)), \qquad (1)$$

$$y(t)=g(x(t),z(t),u(t)), \qquad (2)$$

$$h(z(t),x(t),y(t),u(t))=0, \qquad (3)$$

where x are the system state variables, y are the measurements, u are inputs such as control commands, z are the algebraic variables and $h(z(t), x(t), y(t))=0$ constitutes a nonlinear invariant manifold of system variables. This manifold establishes invariant relations among the system variables based upon the fundamental underlying physics of the system. The mapping h comprises two types:

1. First-principle invariance: invariant principles known from first-principles (i.e. physics-based) modeling.
2. Data-driven invariance: invariant principles learned from data using Artificial Intelligence (AI).

Traditionally, DAE system modeling methods have emerged from the first type, namely, the first-principle invariance. However, machine learning can be leveraged to learn the system invariant principles from data. In addition, machine learning may uncover other invariant principles that might be unknown or difficult to capture via first-principles. While system trajectories can change due to changes in the system signals, initial conditions and variations of the plant dynamics, the invariant manifold h remains intact.

The core of an Attack Detection and Localization Engine (such as the abnormality detection and localization computer platform 150 of FIG. 1) in a cyber-physical security system is a high-dimensional decision boundary computed in feature space, which classifies the system behavior into normal data and abnormal data. The decision may be made at different levels, at an overall system level, at a subsystem level or at a component level. The term "feature" refers to any mathematical characterizations of data. Examples of features as applied to data include, but are not limited to, statistical features, such as maximum and minimum, mean, standard deviation, variance, and/or higher order statistics, rise time, settling time, Fast Fourier Transform (FFT) spectral components, and/or linear and non-linear principal components, independent components, sparse coding, deep learning based, and the like. The structural natural frequencies can also be considered as features. In some implementations, the type and number of features are selected using feature discovery techniques, and the decision boundary is computed using real-world operation or synthetic datasets to separate the normal operational space and the abnormal operational space of the system.

Figure 2:
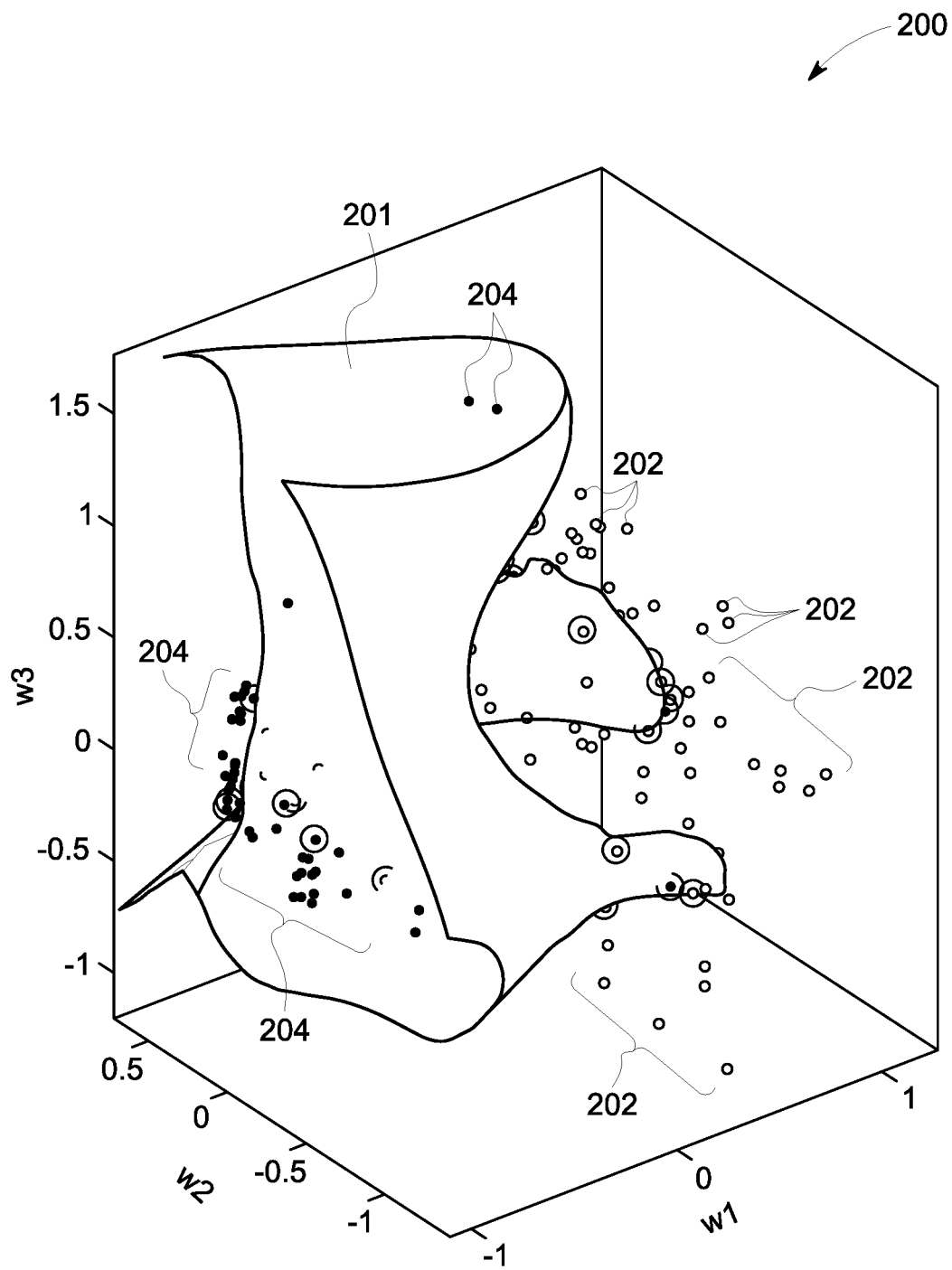
FIG. 2 illustrates an isosurface plot of a three-dimensional decision boundary in accordance with some embodiments of the disclosure.

FIG. 2 illustrates an isosurface plot 200 of a three-dimensional decision boundary in accordance with some embodiments. An invariant manifold 201 or decision boundary is shown that was computed using three first-principal components as features and a kernel-SVM classier, separating normal operating points 202 and abnormal operating points 204. The system is subject to model and parametric uncertainties as well as variable factors such as aging (or degradation) of industrial components, and therefore the true normal and abnormal operational spaces will drift over time. However, given that the aging and drift models are known, and that the bounds on the parameter uncertainties (such as system manufacturing tolerances, control performance characteristics for tracking errors, etc.) are known, an intelligent agent can learn the correct models for such variations and characterize the acceptable levels of drift over time for the decision boundary, in the form of an invariant manifold 201. In some embodiments, the invariant manifold 201 is not in the original raw signal space but is in the feature space, providing the ground truth for all possible acceptable variations of the decision boundary in that space. Since the feature space is high-dimensional, in many cases efficient dimensionality reduction is crucial. Accordingly, an attack-resilient dimensionality reduction can be realized by using random matrix-based projections, as will be described herein. The resultant invariant manifold can then be utilized as a watchdog (a watchdog manifold or certification manifold), for example generated by an artificial intelligence (AI) Watchdog computer platform 160 (See FIG. 1), to monitor the integrity of the cyber-security engine.

Machine Learning (or AI) algorithms are typically trained on naive datasets without keeping an adversary in mind. However, such algorithms can be easily tricked by an attacker via simple techniques such as by sniffing data from the network or even by random guessing in some cases. Such attacks can be very expensive to prevent and/or recover from, especially when the attack occurs on critical infrastructure applications such as the power grid or wind farms. It is therefore desirable to utilize intelligent classification algorithms that are robust to attacks on the machine learning algorithms, and thus disclosed embodiments of the dimensionality reduction process (which is a crucial step for most big-data based AI algorithms) is made robust to evasion-based adversarial attacks by using random matrix-based projections which provide a resilient dimensionality reduction process.

The purpose of a dimensionality reduction step is to look at big data from a lower dimensional perspective to enable the focus to be on the most important aspects of the data that contribute to the classification process. This step can be thought of as analogous to performing an abstraction on the data. In other words, dimensionality reduction removes the noise in the data in such a manner that the separation between different classes in the data is evident and easier for the classifier to work on. However, traditional dimensionality reduction techniques such as Principal Component Analysis (PCA) are well known and cheap to implement. As a result, using traditional techniques such as PCA for dimensionality reduction can be a potential source of vulnerability to the classifier since the adversary may have sufficient resources to perform these techniques to decipher the inner-workings of the classifier and thereby use this information to generate evasion attacks. Consequently, in embodiments disclosed herein, random matrix-based projections are used for dimensionality reduction (a resilient dimensionality reduction process) to add a layer of abstraction to the data, in an effort to reduce the success rate of the adversary or attacker. An advantage of using this method is that, even if the adversary deciphered the random projection used at one time instant, the adversary will not be able to use it in the next time instant due to the randomness of the process used to generate the projection matrices. Thus, a classifier built using these random projections will be more robust against evasion attacks.

Figure 3:
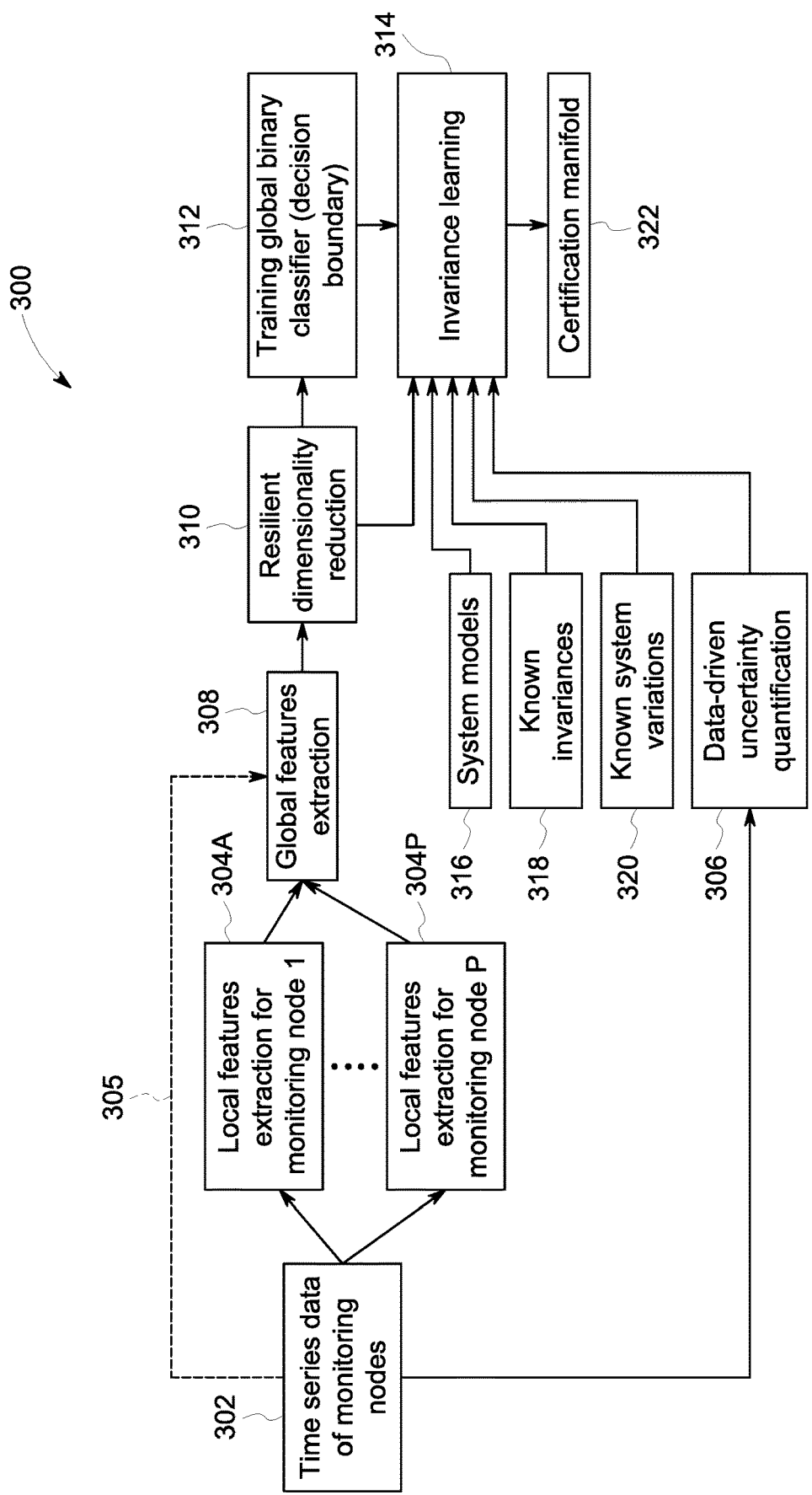
FIG. 3 is a block diagram of an off-line training process for a self-certified cyber-physical security system having a plurality of monitoring nodes according to some embodiments of the disclosure.

The training phase of the resilient dimensionality reduction process can be described as follows: Suppose $X \in R^{m \times n}$ represents the data matrix with each row corresponding to a data sample and $Y \in \{-1, 1\}^m$ represents the corresponding labels. Let $f_A$ be a projection distribution (an example would be a zero mean Gaussian distribution). During the training phase, multiple samples $A \in R^{n \times d}$ are drawn from the projection distribution $f_A$. For each of the sample draws, a classifier F is built using the data $\{XA, Y\}$ instead of $\{X, Y\}$. Let the number of such classifiers built during the training phase be N. During the testing phase, the random projection matrix and the corresponding classifier are chosen at random. Mathematically, the overall classifier at test time can be represented as:

$$\tilde{F} = \sum_{i=1}^{N} L_i F_i$$

where $L_i = \begin{cases} 1 \text{ if } i \text{ was the integer picked at random;} \\ 0 \text{ else} \end{cases}$ FIG. 3 is a block diagram of an off-line training process 300 for a self-certified cyber-physical security system having a plurality of monitoring nodes according to some embodiments. Time series data 302 of the plurality of monitoring nodes (Node 1 to Node P) of the cyber-physical system is processed to obtain local features extraction data 304A to 304P for each node and is also used to obtain a data-driven uncertainty quantification 306. The local features extraction data 304A to 304P can then be used to obtain a global features extraction value 308. Alternately, features can be obtained 305 directly from the time series data that capture interaction between different signals. Thus, there are two ways to obtain the global features: 1. Obtaining higher level features from local features; and 2. Obtaining features that capture interaction between different signals directly from the time series data. The global features are then exposed to a resilient dimensionality reduction process 310. The resilient dimensionality reduction process output data 310 is then input to a global binary classifier process 312 and to an invariance learning algorithm 314. The invariance learning algorithm 314 is also provided with systems models data 316, known invariances data 318 (such as algebraic constraints), known systems variations data 320 (such as parameter uncertainties, part tolerances, and the like), and data-drive uncertainty quantification data 306. The invariance learning algorithm 314 then generates a certification manifold 322 (or watchdog manifold), which is utilized for comparison with real-time security data obtained from the monitoring nodes during operation of the cyber-physical security system (which is monitoring an industrial machine or industrial control system, for example). In some embodiments, the certification manifold is displayed to an operator and/or to security personnel on a display screen (not shown) for comparison to real-time cyber-security data obtained from one or more nodes during operation of a physical machine and/or control system.

It is also contemplated that an alarm may be generated when the data from one or more nodes of the physical system falls outside the decision boundary, which indicates that one or more components are behaving in a detrimental manner. In such circumstances, in some embodiments the self-certified cyber-physical security system may automatically reset or modify the operation of one or more components of the physical system in response to data indicative of a cyber-attack such as in a resilient control scheme for attack neutralization. The global decision boundary determined the system status at the global (i.e. system) level. Local decision boundaries may also be trained at the node or subsystem levels using individual nodes and/or subsystem local features.

Figure 4:
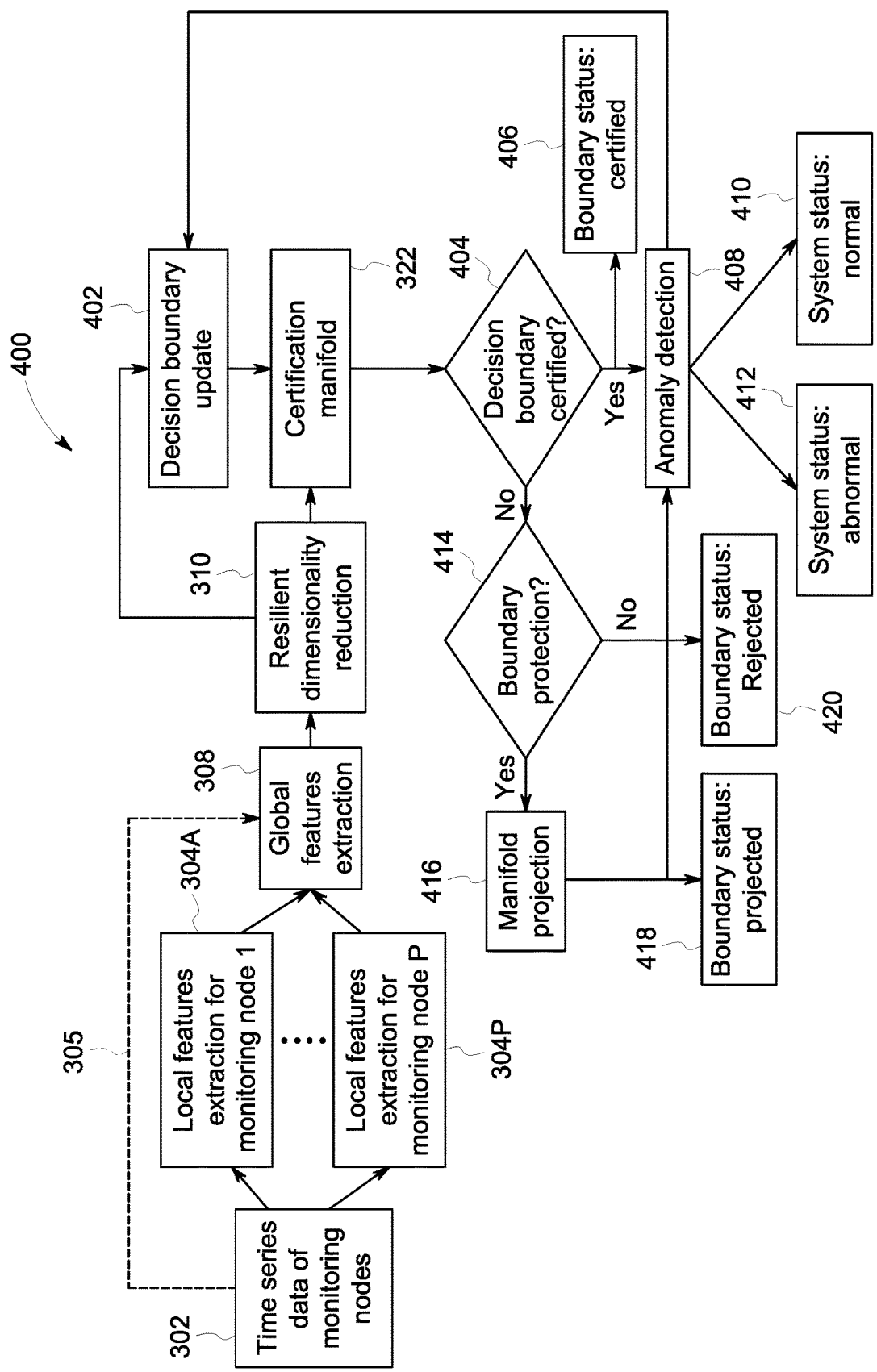
FIG. 4 is a block diagram of a real-time operation process for a self-certified cyber-physical security system having a plurality of monitoring nodes according to some embodiments of the disclosure.

FIG. 4 is a block diagram of a real-time operation process 400 for a self-certified cyber-physical security system having a plurality of monitoring nodes according to some embodiments. As before, time series data 302 of the plurality of monitoring nodes (Node 1 to Node P) of the cyber-physical system is processed to obtain local features extraction data 304A to 304P for each node and is also used as input to obtain a global features extraction value 308. As also explained earlier, features can also be obtained 305 directly from the time series data that capture interaction between different signals. Thus, there are two ways to obtain the global features: 1. Obtaining higher level features from local features; and 2. Obtaining features that capture interaction between different signals directly from the time series data. The global features are then exposed to a resilient dimensionality reduction process 310. The reduced dimensional data obtained through the resilient dimensionality reduction process 310 is then fed to a decision boundary update process 402 (which utilizes continuous adaptive/online learning data) to generate a decision boundary for comparison to the certification manifold 322. If a determination 404 is made that the decision boundary is certified, then a boundary status 406 is set to "certified" and an anomaly detection process determines 408 whether the system status is normal 410 or abnormal 412. In some embodiments, the anomaly detection process may be an algorithm or set of instructions which causes a computer processor to compare current system operating parameter data to what is considered as normal system operating parameter data and produce one or more outputs indicating system status (normal or abnormal). It should be noted that the certification algorithm is concerned with the health of the anomaly detection algorithm, and that the detection algorithm itself is concerned with the health of the system. Accordingly, when the system is under attack while the algorithm is certified, the system status would be declared as being abnormal.

Referring again to step 404, if a determination is made that the updated decision boundary is not certified (indicating that there is an attack on the cyber-security engine) then a boundary projection process 414 may occur, resulting in a manifold projection 416 and setting 418 a boundary status of "projected." In addition, anomaly detection 408 occurs with either a system status of "normal" or "abnormal." However, if a boundary projection 414 does not occur, then the boundary status 420 is set to "rejected," meaning that the decision boundary will not be updated and the previous decision boundary will still be used for anomaly detection.

Accordingly, the Watchdog manifold or certification manifold is an invariant manifold indicating the decision boundary. Any changes to the decision boundary must be made within the certification manifold. Thus, if the cybersecurity engine that protects the system is itself compromised, and as a result, the decision boundary is manipulated (changed by an adversary), such an unauthorized modification will be detected by the self-certification mechanism. This methodology is also useful for certifying authorized modifications of the decision boundary during event-based updates or via continuous learning. As the decision boundary evolves, its invariant manifold provides ultimate boundaries for acceptable variations. The watchdog manifold or certification manifold may have the same dimension as the decision boundary, using the same features, or it may have a lower dimension than the decision boundary, using a subset of the features. Accordingly, the watchdog manifold can be exploited in two ways:

1. Detection of unacceptable variations: Detects and then raises an alarm regarding any unacceptable variations of the decision boundary (whether authorized or unauthorized).
2. Auto-correction of unacceptable variations: Once an unacceptable variation of the decision boundary is detected, the watchdog manifold or certification manifold is used to automatically correct the unacceptable variation.

In some embodiments, auto-correction of any variations of the decision boundary deemed to be unacceptable is done by projecting the new decision boundary back into the invariant manifold. This idea roots back to the high-index differential algebraic equations (DAE) solvers in which the trajectories of the system are projected into the algebraic constraints, making sure that the system variables always satisfy the algebraic constraints within a predefined certain threshold. Here, instead of system trajectories, an entire manifold (the decision boundary) is projected into another manifold (the watchdog or certification boundary), to ensure it passes the certification of the watchdog manifold.

Figure 5:
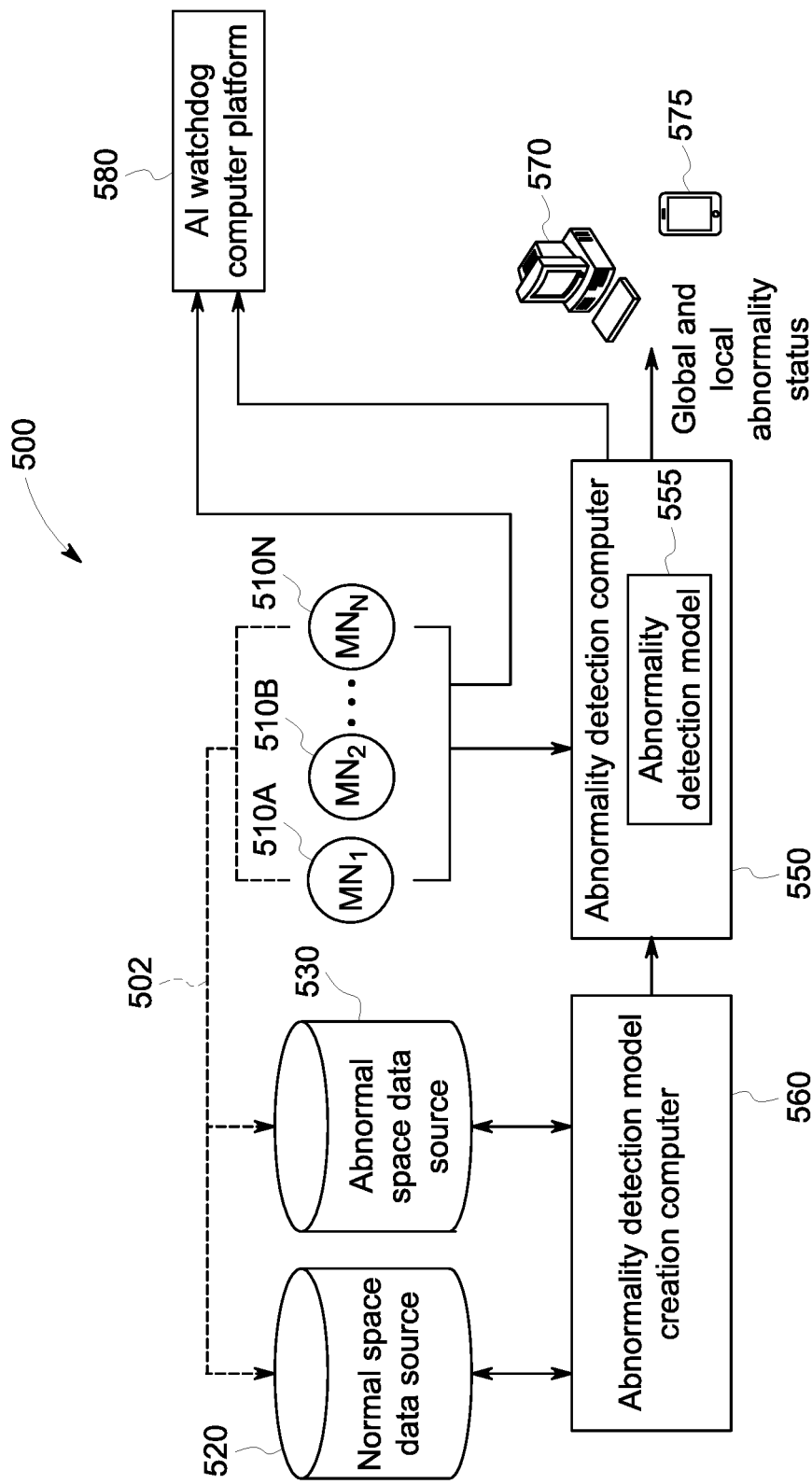
FIG. 5 is a high-level architecture of a features system in accordance with some embodiments of the disclosure.

A description of how the separate AI watchdog process (or certification manifold process) may be incorporated in an abnormality detection system will now be provided. FIG. 5 is a high-level architecture of a features system 500 in accordance with some embodiments. The system 500 may include monitoring node sensors 510A ($MN_1$) through 510N ($MN_N$), a "normal space" data source 520 (or normal space database 520), and an "abnormal space" data source 530 (or abnormal space database 530). The normal space data source 520 may store, for each of the plurality of monitoring nodes 510, a series of normal values over time that represent normal operation of a cyber-physical system (for example, generated by a model or collected from actual sensor data as illustrated by the dashed line 502 shown in FIG. 5). The abnormal space data source 530 may store, for each of the monitoring nodes 510, a series of abnormal values that represent abnormal operation of the cyber-physical system (for example, values indicating that the system is experiencing a cyber-attack or a fault).

Information from the normal space data source 520 and the abnormal space data source 530 may be provided to an abnormality detection model creation computer 560 that uses this data to create a decision boundary (that is, a boundary that separates normal behavior from abnormal behavior). The decision boundary may then be used by an abnormality detection computer 550 executing an abnormality detection model 555. The abnormality detection model 555 may, for example, monitor streams of data from the monitoring nodes 510 comprising data from sensor nodes, actuator nodes, and/or any other critical monitoring nodes (for example, sensor nodes 110A through 110N ($MN_1$ through $MN_N$)) and automatically output global and local abnormality status signals to one or more remote monitoring devices when appropriate (for example, for display to an operator on a display screen, or to have an abnormality localized). In addition, in accordance with embodiments disclosed herein, the feature system 500 includes an AI watchdog computer platform 580 that, as explained above, operates to check and/or monitor the decision boundary being utilized by the system 500.

Referring again to FIG. 5, in some embodiments data from the monitoring node sensors 510 $MN_1$ through $MN_N$ is input to the AI watchdog computer platform 580 along with the decision boundary created by the abnormality detection model creation computer 560. The AI watchdog computer 580 then compares a certification manifold to the decision boundary to determine whether or not to certify the status of the decision boundary, and to perform anomaly detection processing. In some implementations, the AI watchdog computer platform 580 automatically outputs certification signals, normal system status signals, and/or abnormal system status signals, as appropriate, to one or more remote monitoring devices (not shown; for example, for display to an operator on a display screen). In addition, in accordance with some embodiments, information about detected threats or faults may be transmitted back to a cyber-physical system control system (not shown).

As used herein, devices, including those associated with the system 500 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The abnormality detection model creation computer 560 may store information into and/or retrieve information from various data stores, such as the normal space data source 520 and/or the abnormal space data source 530. The various data sources may be locally stored or reside remote from the abnormality detection model creation computer 560. Although a single abnormality detection model creation computer 560 is shown in FIG. 5, any number of such devices may be included. Moreover, various devices described herein might be combined according to embodiments of the present invention. For example, in some embodiments, the abnormality detection model creation computer 560 and one or more data sources 520, 530 might comprise a single apparatus. The abnormality detection model creation computer 560 functions may be performed by a constellation of networked apparatuses, in a distributed processing or cloud-based architecture. Similarly, functions of the AI watchdog computer 580 may be performed by a constellation of networked apparatuses, in a distributed processing or cloud-based architecture.

A user may access the system 500 via a monitoring device such as a Personal Computer ("PC") 570 or a smartphone 575 (but other types of monitoring devices, such as a tablet computer, could also be used) to view information about and/or manage abnormality information in accordance with any of the embodiments described herein. In some cases, an interactive graphical display interface may let a user define and/or adjust certain parameters (for example, abnormality detection trigger levels or remediation steps) and/or provide or receive automatically generated recommendations or results from the abnormality detection model creation computer 560 and/or abnormality detection computer 550 and/or AI Watchdog computer 580.

Thus, some embodiments described herein may use time series data from one or more monitoring nodes 510 from a cyber-physical asset (for example, an industrial or an enterprise system) and provide reliable abnormality detection and/or cyber-attack detection with low false positive rate. The system may extract features from the time series data for each monitoring node. The term "feature" may refer to, for example, mathematical characterizations of data. Examples of features as applied to data might include the maximum and minimum, mean, standard deviation, variance, settling time, Fast Fourier Transform ("FFT") spectral components, linear and non-linear principal components, independent components, sparse coding, deep learning, and the like. The type and number of features for each monitoring node might be optimized using domain-knowledge and/or a feature discovery process. The features may be, for example, calculated over a sliding window with consecutive samples of specified duration from time series data. The length of the window and the duration of overlap for each batch may be determined from domain knowledge and an inspection of the data or using batch processing. Note that features may be computed at the local level (associated with each monitoring node) and the global level (associated with all the monitoring nodes, that is for the whole or entire asset). The time-domain values of the nodes or their extracted features may be, according to some embodiments, normalized for better numerical conditioning.

Some embodiments described herein may take advantage of the physics of a control system by learning a priori from tuned high-fidelity equipment models and/or actual "on the job" data to detect single or multiple simultaneous adversarial threats to the system. Moreover, according to some embodiments, all monitoring node data may be converted to features using advanced feature-based methods, and the real-time operation of the control system may be monitored in substantially real-time. Abnormalities may be detected by classifying the monitored data as being "normal" or disrupted (or degraded). The decision boundary may be constructed using dynamic models and may help enable early detection of vulnerabilities (and potentially avert catastrophic failures) allowing an operator to restore the control system to normal operation in a timely fashion.

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with Design of Experiments (DoE) techniques. Moreover, multiple algorithmic methods (e.g., support vector machines or machine learning techniques) may be used to generate decision boundaries. Since boundaries may be driven by measured data (or data generated from high-fidelity models), defined boundary margins may help to create an abnormal zone in a multi-dimensional feature space. Moreover, the margins may be dynamic in nature and adapted based on a transient or steady state model of the equipment and/or be obtained while operating the system as in self-learning systems from incoming data stream. According to some embodiments, a training method may be used for supervised learning to teach decision boundaries. This type of supervised learning may take into account on operator's knowledge about system operation (e.g., the differences between normal and abnormal operation).

Since attacks might be multi-prong (e.g., multiple attacks might happen at once), DoE experiments may be designed to capture the attack space (for example, using full factorial, Taguchi screening, central composite, and/or Box-Behnken). When models are not available, these DoE methods can also be used to collect data from a real-world asset control system. Experiments may run, for example, using different combinations of simultaneous attacks. Similar experiments may be run to create a data set for the normal operating space. In addition, according to some embodiments the system may detect "degraded" or faulty operation as opposed to a threat or attack. Such decisions may require the use of a data set for a degraded and/or faulty operating space.

Thus, embodiments may enable the passive detection of indications of multi-class abnormal operations using real-time signals from monitoring nodes. Moreover, the detection framework may allow for the development of tools that facilitate proliferation of the disclosed methods to various systems (for example, turbines) in multiple geolocations. According to some embodiments, distributed detection systems enabled by this technology (across multiple types of equipment and systems) will allow for the collection of coordinated data to help detect multi-prong attacks. Note that the feature-based approaches described herein may allow for extended feature vectors and/or incorporate new features into existing vectors as new learnings and/or alternate sources of data become available. As a result, embodiments may detect a relatively wide range of cyber-threats (for example, stealth attacks, replay attacks, covert attacks, injection attacks, and the like) as the systems learn more about their characteristics. Embodiments may also reduce false positive rates as systems incorporate useful key new features and remove ones that are redundant or less important. Note that the detection systems described herein may provide early warning to cyber-physical system operators so that a cyber-attack may be thwarted (or the effects of the attack may be blunted or minimized), thus reducing damage to equipment.

Figure 6:
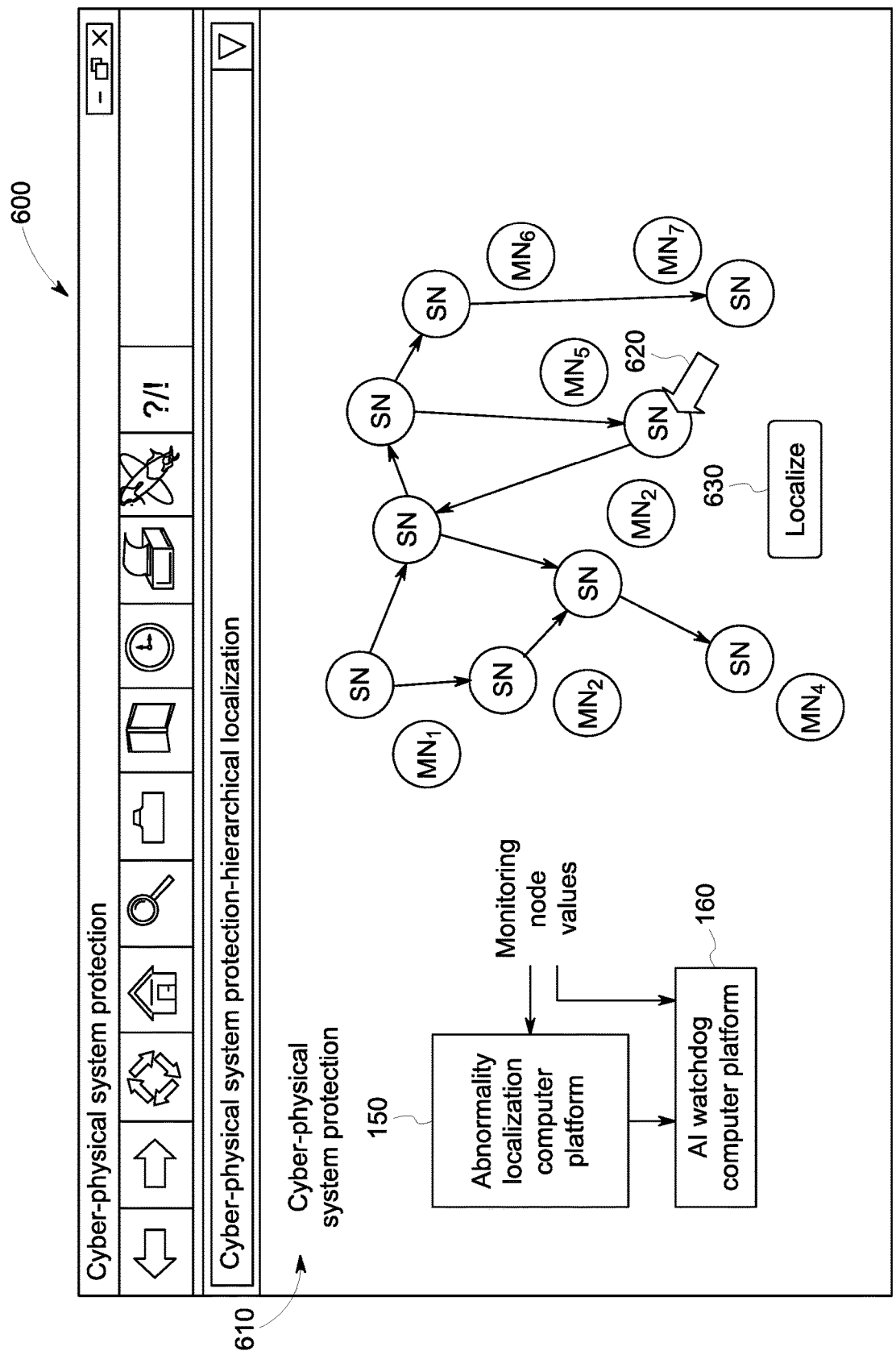
FIG. 6 is an example of a cyber-physical system protection display that may be used, for example, to provide a graphical depiction of a cyber-physical system to an operator and/or to provide an interactive interface allowing an administrator to adjust system components as appropriate according to some embodiments of the disclosure.

FIG. 6 is an example of a cyber-physical system protection display 600 that might be used, for example, to provide a graphical depiction 610 of a cyber-physical system (e.g., including system nodes, monitoring nodes, and node connections) to operator and/or cyber security personnel, which may provide an interactive interface allowing the operator to adjust system components as appropriate. Selection of an element on the display screen 610 (e.g., via a touchscreen or computer mouse pointer 620) may let the operator see more information about that particular element (e.g., in a pop-up window) and/or adjust operation of that element. Selection of a "Localize" icon 630 might cause the system to automatically determine where an abnormality originated.

Figure 7:
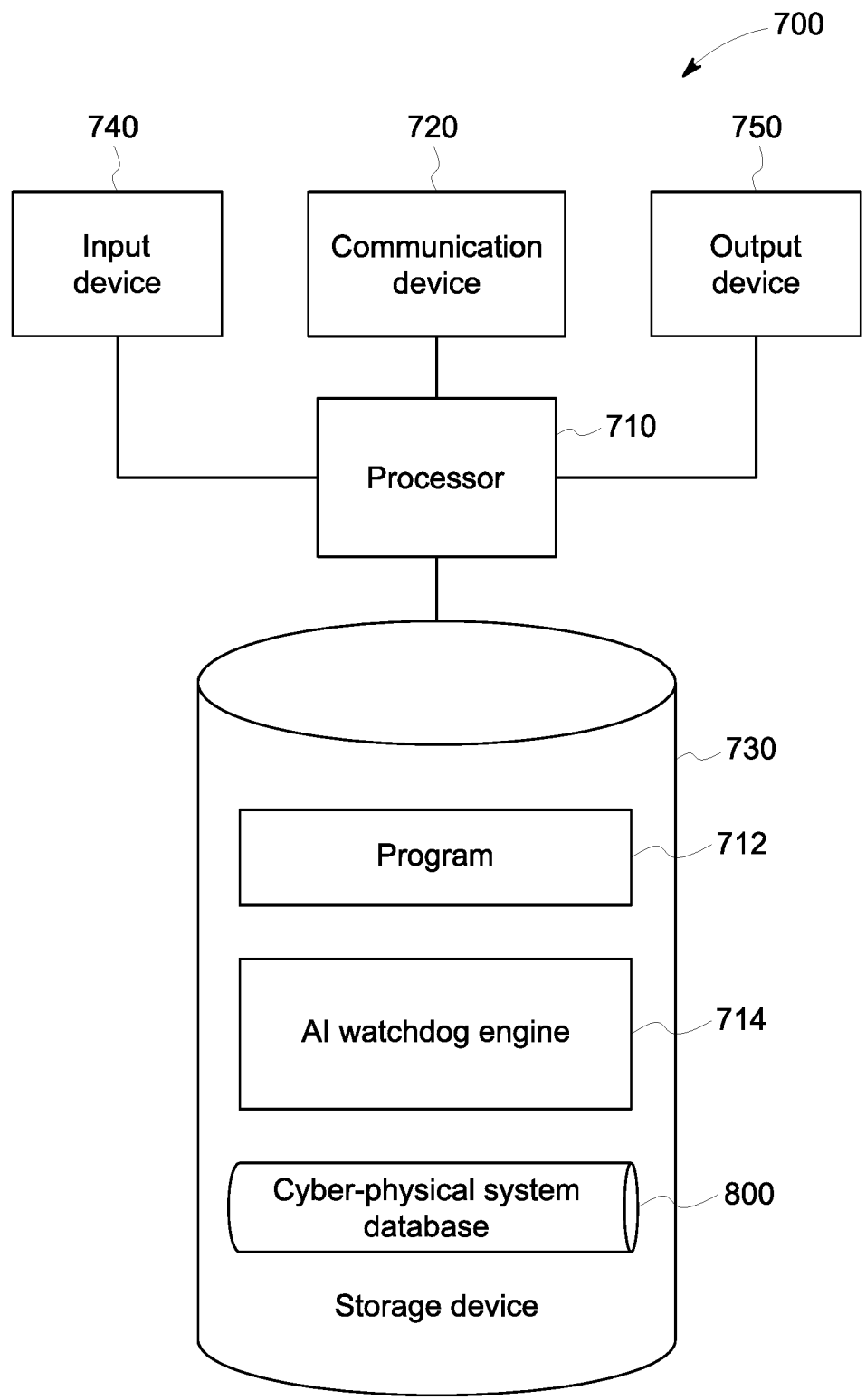
FIG. 7 is a block diagram of an AI watchdog computer that may be, for example, associated with the systems of FIGS. 1 and 5, respectively, in accordance with embodiments of the disclosure.

Note that the embodiments described herein may be implemented using any number of different hardware configurations. For example, FIG. 7 is a block diagram of an AI watchdog computer 700 that may be, for example, associated with the systems 100, 500 of FIGS. 1 and 5, respectively, and/or any other system described herein. The AI watchdog computer 700 comprises an AI watchdog processor 710, such as one or more commercially available Central Processing Units ("CPUs") in the form of one-chip microprocessors, or one or more custom-designed processors, coupled to a communication device 720 configured to communicate via a communication network (not shown in FIG.

7). The communication device 720 may be used to communicate, for example, with one or more remote monitoring nodes, user platforms, digital twins, and the like. The AI watchdog computer 700 further includes an input device 740 (e.g., a computer mouse and/or keyboard to input cyber-physical system parameters and/or modeling information) and/an output device 750 (e.g., a computer monitor, such as a touch screen, to render a display, provide alerts, transmit recommendations, and/or create reports). According to some embodiments, a mobile device, monitoring physical system, and/or PC may be used to exchange information with the AI watchdog computer 700.

The processor 710 also communicates with a storage device 730. The storage device 730 may comprise any appropriate information storage device, including combinations of magnetic storage devices (e.g., a hard disk drive), optical storage devices, mobile telephones, and/or semiconductor memory devices. The storage device 730 stores a program 712 and/or a cyber-physical system AI Watchdog engine 714 for controlling the processor 710. The processor 710 operates by processing instructions of the programs 712, 714, and thereby operates in accordance with any of the embodiments described herein. For example, the processor 710 may generate a certification manifold and compare it to a decision boundary in real time during operation of a cyber-physical system. The processor 710 may then determine, based on a comparison between the certification manifold and the decision boundary, not to certify the decision boundary and/or may detect an anomaly (indicating an abnormal system status), and then transmit, via the communication device 720, an alert message, for example to a mobile device of a cyber-security personnel, regarding such abnormal status.

The programs 712, 714 may be stored in a compressed, uncompiled and/or encrypted format. The programs 712, 714 may furthermore include other program elements, such as an operating system, clipboard application, a database management system, and/or device drivers used by the processor 710 to interface with peripheral devices.

As used herein, information may be "received" by or "transmitted" to, for example: (i) the cyber-physical system protection platform 700 from another device; or (ii) a software application or module within the cyber-physical system protection platform 700 from another software application, module, or any other source.

Figures 8, 9A:
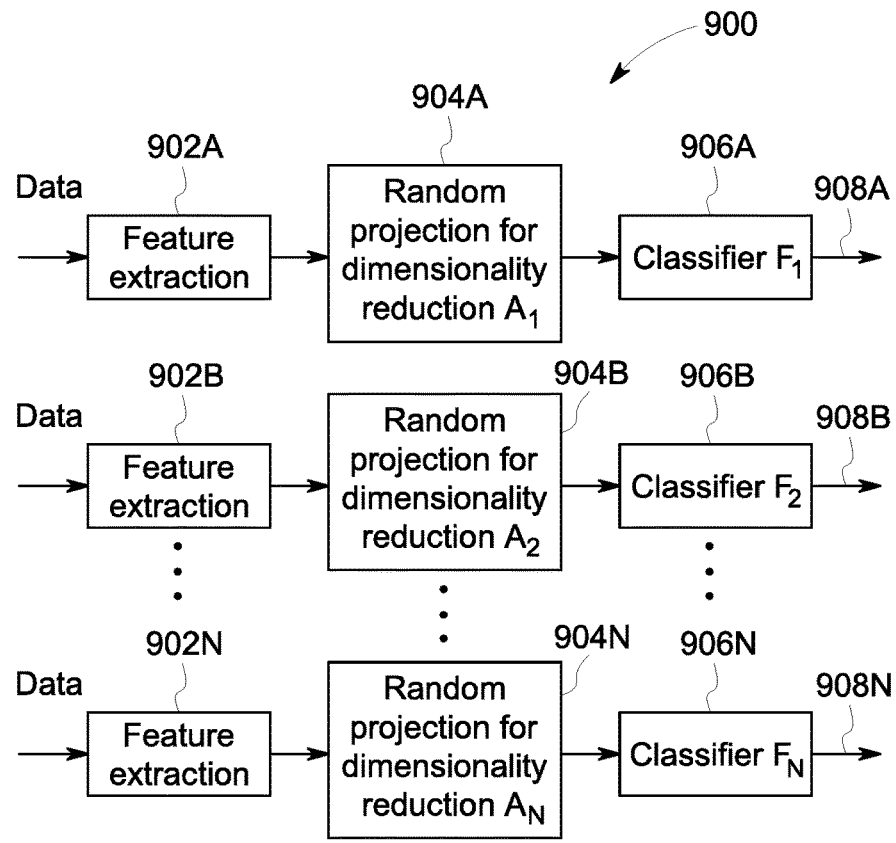
FIG. 8 is a table representing a cyber-physical system database that may be stored at the cyber-physical system protection platform of FIG. 7 according to some embodiments of the disclosure.
FIG. 9A illustrates a training phase for a model creation method according to some embodiments.

In some embodiments (such as the one shown in FIG. 7), the storage device 730 further stores a cyber-physical system database 800, which is described in detail with respect to FIG. 8. Note that the storage device 730 described herein is only one example, and additional and/or different information may be stored therein. Moreover, various databases might be split or combined in accordance with any of the embodiments described herein.

Referring to FIG. 8, a table is shown that represents the cyber-physical system database 800 that may be stored at the AI watchdog computer 700 according to some embodiments. The table may include, for example, entries identifying cyber-physical systems to be protected and associated monitoring nodes. The table may also define fields 802, 804, 808, 810, 812 for each of the entries. The fields 802, 804, 808, 810, 812 may, according to some embodiments, specify: a cyber-physical system identifier 802, a cyber-physical system description 804, local feature vectors 808, global feature vectors 810, and a status 812. The cyber-physical system database 800 may be created and updated, for example, when a new physical system is monitored or modeled, an attack is detected, and the like.

The cyber-physical system identifier 802 and description 804 may define a particular asset or system that will be protected along with a particular monitoring node associated with that system. The local feature vectors 808 and global feature vectors 810 may be based on features extracted from times series data for each monitoring node. The local watermarking feature vectors 808 and global watermarking feature vectors 810 may be generated based on random watermarking signals that were injected at certain points within the system. The status 812 might indicate if a monitoring node is normal, attacked, fault, and the like.

Thus, embodiments may provide technical improvements to cyber-physical system protection. For example, a system may enable algorithm coverage even for large-scale systems, such as a Heat Recover and Steam Generation ("HRSG") system (which may contain hundreds of nodes). In addition, the novel methods, systems and apparatus disclosed herein provide new capabilities for protecting machine learning algorithms (including cybersecurity engines, which themselves could also be attacked) against intelligent adversaries. Some embodiments of the processes disclosed herein also provide for validating updates of a decision boundary in real-time, through means such as continuous learning. Furthermore, the disclosed methods, systems and apparatus provide another path for protecting a cybersecurity engine from being victimized by a targeted attack, which can be utilized in addition to deploying a secure hardware platform. Yet further, the present methods, systems and apparatus may be used in a context beyond cyber-security applications, for example, to protect online machine learning solutions for safety critical missions or the like.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

As mentioned earlier, many conventional Machine Learning (or AI) algorithms are trained on naïve datasets without the adversary in mind, and thus such algorithms can be easily tricked by an attacker via simple techniques, such as sniffing data from the network or random guessing in some cases. Thus, intelligent classification algorithms that are robust to such attacks on the machine learning algorithms are required. In some embodiments, the dimensionality reduction process (which is the most crucial step in most of the big-data based AI algorithms) is made more robust to evasion-based adversarial attacks by using random matrix-based projections for dimensionality reduction. Evasion attacks are defined as the attacks that happen at the test time. In this type of an attack, the adversary tries to generate adversarial samples using the normal and/or healthy data samples via small perturbations so that the perturbed sample (the adversarial sample) is misclassified by the classifier as a healthy sample. Thus, in an implementation of a resilient dimensionality reduction process, random matrix projections are used for dimensionality reduction, wherein an assumption is made that the adversary does not have complete knowledge of the classifier that is being utilized (thus, the attacks are black or grey box attacks).

Dimensionality reduction can be viewed as an abstraction to the data, wherein the dimensionality reduction process removes the noise in the data in such manner that the separation between different classes in the data is evident and easier for a classifier to work on. Since traditional dimensionality reduction techniques such as Principal Component Analysis (PCA) are well known and cheap to implement, using such traditional techniques for dimensionality reduction step can be a potential source of vulnerability to the classifier because an adversary may have sufficient resources to perform these techniques to decipher the inner-workings of the classifier and thereby use this information to generate attacks. Thus, in some implementations of a resilient dimensionality reduction process, random matrix-based projections are used for dimensionality reduction to add a layer of abstraction to the data thereby reducing the success rate of the adversary. Literature studies provide theoretic evidence based on the Johnson-Lindestrauss lemma that the use of random projection matrices preserves the distances and angles, and thus normal and attack spaces would be preserved under the random projections, which therefore can form the basis of a defense to evasion attacks.

Figure 9B:
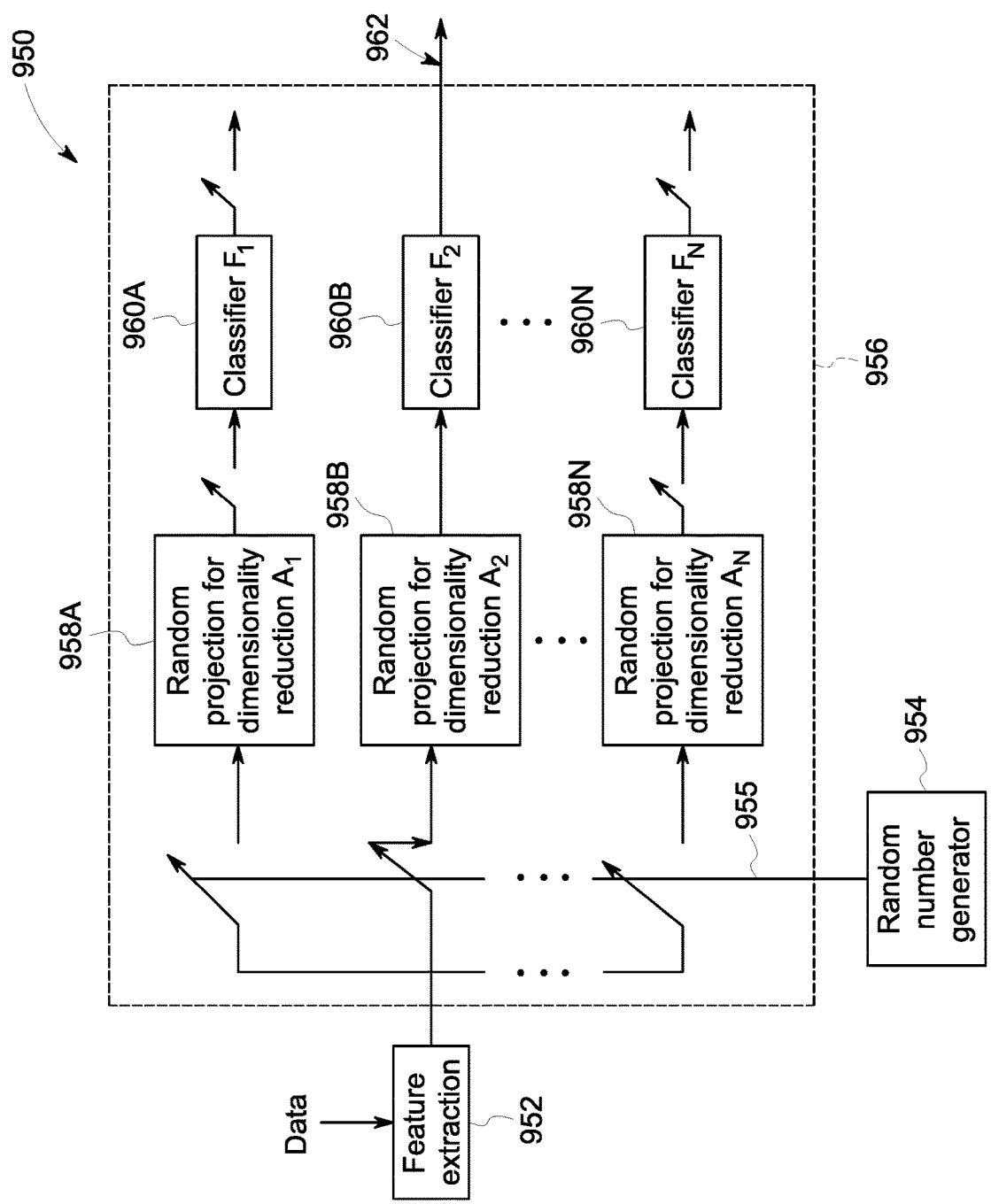
FIG. 9B illustrates a testing phase, wherein the random projection matrix and the corresponding classifier are chosen at random, which provides system status outputs in accordance with some embodiments.

FIGS. 9A and 9B are block diagrams illustrating a training phase 900 and a testing phase 950, respectively, in accordance with some embodiments. Referring to FIG. 9A, monitoring node data is input to a feature extraction process 902A to 902N, and then the resultant output data is fed to associated random projection for resilient dimensionality reduction processes 904A to 904N. The outputs of the random projection for dimensionality reduction processes are used by classifiers 906A to 906N to provide output status 908A to 908N of the system as being normal or abnormal. In particular, during the training phase, for every stream of data entering the block 902A through 902N in FIG. 9A, the features of the data are extracted and projected onto a reduced dimensional space using the blocks 904A through 904N. During the training phase, N-different resilient dimensionality reductions (represented by 904A through 904N in FIG. 9A) are applied independently on the features extracted from the data. For each of the N different dimension reduction methods a corresponding classifier (as represented by the blocks 906A through 906N in FIG. 9A) is trained for the purpose of anomaly detection on the system.

Referring to FIG. 9B, during the testing phase 950, the random projection matrix and the corresponding classifier are chosen at random. Accordingly, for each data stream, feature extraction is performed as represented by block 952 in FIG. 9B. A random number generator 954 provides random integers between 1 and N as input data for the process 956, which transforms the data using a random projection for the resilient dimensionality reduction process 958A to 958N using one of the N dimensionality reduction methods used during the training phase. This data in the reduced dimensional space is then fed to the corresponding classifier 960A to 960N to determine the status of the system (i.e., normal or abnormal). For example, referring again to FIG. 9B, when the random number generator 954 generates an output 955 of "two," then the second dimensionality reduction method 958B and the second classifier 960B are chosen to provide the output data 962 for the process 956.

With reference to FIG. 3, which illustrates an off-line training process 300 for the AI watchdog platform that generates a certification manifold 322 (or watchdog manifold), in some embodiments the process illustrated by FIG. 9B is utilized such that the output of the training global binary classifier 312 of FIG. 3 is the same as output 962 of the classifier 960B of the process 956 of FIG. 9B. In addition, with reference to FIG. 4, which depicts a real-time operation process 400 for a self-certified cyber-physical security system, in some embodiments the process illustrated by FIG. 9B is utilized such that the output of the decision boundary update process 402 of FIG. 4 is the same as the output 962 of the classifier 960B of the process 956 shown in FIG. 9B. Thus, in some embodiments the disclosed randomization projection for the resilient dimensionality reduction process of FIG. 9B may be utilized in one or both of the processes illustrated by FIGS. 3 and 4.

An adversary might have variable levels of knowledge of the classifier ranging from only being able to observe the labels of the samples (black box adversary) to knowing the structure of the classifier (white box adversary). Due to the randomness associated with the choice of the classifier and the dimensionality reduction, this technique makes it inherently difficult for a black box adversary to generate adversarial samples given that the adversary would have to first estimate a classifier based on the observed labels. Moreover, even if the classifier estimation is close to the structure of the class of classifiers being used, to generate an adversarial sample, the adversary must still guess and/or estimate the random projection subspace into which the perturbation would eventually be projected onto. Standard gradient based approaches such as the popular Fast Gradient Sign method would fail to produce effective adversarial samples due to the presence of randomness in the detection procedure. Accordingly, a key advantage of this method is that, even if the adversary deciphered the random projection used at one time instant, the adversary will not be able to use it in the next time instant due to the randomness of the process used to generate the projection matrices. Therefore, a classifier built using these random projections will be more robust against evasion attacks than conventional approaches.

Although specific hardware and data configurations have been described herein, note that any number of other configurations may be provided in accordance with embodiments of the present invention (e.g., some of the information associated with the databases described herein may be combined or stored in external systems). Moreover, although some embodiments are focused on gas turbines, any of the embodiments described herein could be applied to other types of cyber-physical systems including power grids, dams, locomotives, additive printers, data centers, airplanes, and autonomous vehicles (including automobiles, trucks, drones, submarines, etc.).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

We claim:

1. A method for self-certifying secure operation of a cyber-physical system having a plurality of monitoring nodes, wherein each monitoring node generates a series of current monitoring node values over time representing current operation of the cyber-physical system, comprising:
   obtaining, by an artificial intelligence (AI) watchdog computer platform using the output of a local features extraction process of time series data of a plurality of monitoring nodes of a cyber-physical system and a global features extraction process, global features extraction data;
   generating, by the AI watchdog computer platform utilizing a resilient dimensionality reduction process on the global features extraction data, reduced dimensional data;

generating, by the AI watchdog computer platform based on the reduced dimensional data, an updated decision boundary;

comparing, by the AI watchdog computer platform, the updated decision boundary to a certification manifold comprising polytypic bounds on current values of the features of the cyber-physical system;

determining, by the AI watchdog computer platform based on the comparison of the updated decision boundary to the certification manifold, that the updated decision boundary is certified;

determining, by the AI watchdog computer platform based on an anomaly detection process, whether the cyber-physical system is behaving normally or abnormally;

transmitting, by the AI watchdog computer platform, at least one of certification signals, normal system status signals, and abnormal system status signals to at least one remote monitoring device;

receiving, by the AI watchdog computer platform from an abnormality detection and localization computer platform, data comprising a current decision boundary of a cyber security system of the cyber-physical system;

determining, by the AI watchdog computer platform, that the current decision boundary does not satisfy the certified decision boundary; and correcting, by the AI watchdog computer platform, the current decision boundary by projecting it onto the certification manifold.

2. The method of claim 1, further comprising, transmitting, by the AI watchdog computer platform to the abnormality detection and localization computer platform, the corrected decision boundary.

3. The method of claim 1, further comprising, transmitting, by the AI watchdog computer platform to a monitoring device of an operator, a system status message indicating a possible attack on the cyber-security system.

4. The method of claim 1, further comprising:
  setting, by the AI watchdog computer platform, a boundary status to projected; and
  determining, by the AI watchdog computer platform based on an anomaly detection process, whether the cyber-physical system is behaving normally or abnormally.

5. The method of claim 4, further comprising transmitting, by the AI watchdog computer platform to a monitoring device of an operator, a system status message indicating one of normal or abnormal behavior of the cyber-physical system.

6. The method of claim 1, wherein the certification manifold is generated utilizing an off-line training process.

7. The method of claim 6, wherein the off-line training process comprises:
  generating, by the AI watchdog computer platform based on a local features extraction process of time series data of monitoring nodes data associated with the cyber-physical system and a global features extraction process, global features extraction data;
  generating, by the AI watchdog computer platform using a resilient dimensionality reduction process on the global features extraction data, resilient reduced dimensional data;
  generating, by the AI watchdog computer platform using a training classifier on the reduced dimensional data, a decision boundary; and
  generating, by the AI watchdog computer platform using invariance learning on the reduced dimensional data, on the decision boundary, and on at least two of system models data, known invariances data, known system invariances data and data-driven uncertainty quantification data, a certification manifold.

8. The method of claim 7, wherein invariance learning comprises utilizing at least one of a first-principle physics-based learning process of the intrinsic physical invariances of the cyber-physical systems and a data-driven learning process of the invariant principles of a cyber-physical system using artificial intelligence (AI) processing.

9. The method of claim 8, wherein the AI processing comprises at least one of deep neural networks, recurrent neural networks, and gaussian models.

10. The method of claim 1, wherein the global features extraction process comprises one of obtaining higher level features from local features and obtaining features that capture interaction between different signals directly from the time series data.

11. The method of claim 1, wherein the local features extraction process comprises:
  receiving, by the AI watchdog computer platform, monitoring node data of a plurality of monitoring nodes;
  extracting, by the AI watchdog computer platform, feature data from the monitoring node data of each monitoring node;
  utilizing, by the AI watchdog computer platform, a random projection for dimensionality reduction process on the feature data of each monitoring node to obtain corresponding projection data for each node; and
  training, by the AI watchdog computer platform, corresponding classifiers to detect anomalies corresponding to each node.

12. A system for self-certifying secure operation of a cyber-physical system having a plurality of monitoring nodes wherein each monitoring node generates a series of current monitoring node values over time representing current operation of the cyber-physical system, comprising:
  an abnormality detection and localization computer platform operably connected to a cyber-physical system; and
  an artificial intelligence (AI) watchdog computer platform operably connected to the abnormality detection and localization computer platform and the cyber-physical system, the AI watchdog computer comprising a watchdog processor and a memory, wherein the memory stores executable instructions which when executed cause the watchdog processor to:
    obtain global features extraction data by using the output of a local features extraction process of time series data of a plurality of monitoring nodes of a cyber-physical system and a global features extraction process;
    generate, utilizing a resilient dimensionality reduction process on the global features extraction data, reduced dimensional data;
    generate an updated decision boundary based on the reduced dimensional data;
    compare the updated decision boundary to a certification manifold comprising polytypic bounds on current values of the features of the cyber-physical system;
    determine, based on the comparison of the updated decision boundary to the certification manifold, that the updated decision boundary is certified;
    determine, based on an anomaly detection process, whether the cyber-physical system is behaving normally or abnormally;

transmit at least one of certification signals, normal system status signals, and abnormal system status signals to at least one remote monitoring device;

receive, from an abnormality detection and localization computer platform, data comprising a current decision boundary of a cyber security system of the cyber-physical system;

determine that the current decision boundary does not satisfy the certified decision boundary; and correct the current decision boundary by projecting it onto the certification manifold.

13. The system of claim 12, wherein the memory of the AI watchdog computer stores further executable instructions which when executed cause the watchdog processor to transmit the corrected decision boundary to the abnormality detection and localization computer platform.

14. The system of claim 12, wherein the memory of the AI watchdog computer stores further executable instructions which when executed cause the watchdog processor to transmit a system status message indicating a possible attack on the cyber-security system to a monitoring device of an operator.

15. The system of claim 12, wherein the memory of the AI watchdog computer stores further executable instructions which when executed cause the watchdog processor to:
set a boundary status to projected; and
determine, based on an anomaly detection process, whether the cyber-physical system is behaving normally or abnormally.

16. The system of claim 15, wherein the memory of the AI watchdog computer stores further executable instructions which when executed cause the watchdog processor to transmit a system status message indicating one of normal or abnormal behavior of the cyber-physical system to a monitoring device of an operator.

17. The system of claim 12, wherein the memory of the AI watchdog computer stores further executable instructions, prior to the instructions for comparing the updated decision boundary to the certification manifold, which when executed cause the watchdog processor to generate the certification manifold by using an off-line training process.

18. The system of claim 17, wherein the memory of the AI watchdog computer stores further executable instructions comprising the off-line training process, which when executed cause the watchdog processor to:
generate, based on a local features extraction process of time series data of monitoring nodes data associated with the cyber-physical system and a global features extraction process, global features extraction data;
generate, using a resilient dimensionality reduction process on the global features extraction data, resilient reduced dimensional data;
generate, using a training classifier on the reduced dimensional data, a decision boundary; and
generate, using invariance learning on the reduced dimensional data, on the decision boundary, and on at least two of system models data, known invariances data, known system invariances data and data-driven uncertainty quantification data, a certification manifold.

19. The system of claim 18, wherein the memory of the AI watchdog computer stores further executable instructions comprising invariance learning, which when executed cause the watchdog processor to utilize at least one of a first-principle physics-based learning process of the intrinsic physical invariances of the cyber-physical systems and a data-driven learning process of the invariant principles of a cyber-physical system using artificial intelligence (AI) processing.

20. The system of claim 12, wherein the memory of the AI watchdog computer stores further executable instructions comprising the global features extraction process, which when executed cause the watchdog processor to one of obtain higher level features from local features and obtain features that capture interaction between different signals directly from the time series data.

21. The system of claim 12, wherein the memory of the AI watchdog computer stores further executable instructions comprising the local features extraction process, which when executed cause the watchdog processor to:
receive monitoring node data of a plurality of monitoring nodes;
extract feature data from the monitoring node data of each monitoring node;
utilize a random projection for dimensionality reduction process on the feature data of each monitoring node to obtain corresponding projection data for each node; and
train corresponding classifiers to detect anomalies corresponding to each node.

22. A computer system for self-certifying operation of a cyber-physical system, the computer system configured to:
receive global features extraction data, the global features extraction data generated at least in part using the output of a local features extraction process of time series data of a plurality of monitoring nodes of a cyber-physical system;
generate reduced dimensional data by utilizing a resilient dimensionality reduction process on the global features extraction data;
generate an updated decision boundary based on the reduced dimensional data;
compare the updated decision boundary to a certification manifold comprising polytypic bounds on current values of the features of the cyber-physical system;
determine that the updated decision boundary is certified based at least in part on the comparison of the updated decision boundary to the certification manifold;
determine whether the cyber-physical system is behaving normally or abnormally based at least in part on an anomaly detection process;
transmit at least one of certification signals, normal system status signals, and abnormal system status signals to at least one remote monitoring device;
receive, from an abnormality detection and localization computer platform, data comprising a current decision boundary of a cyber security system of the cyber-physical system;
determine that the current decision boundary does not satisfy the certified decision boundary; and
correct the current decision boundary by projecting it onto the certification manifold.

* * * * *